3,335,098
CRACKING CATALYST AND PREPARATION THEREOF
Walter L. Haden, Jr., Metuchen, and Frank J. Dzierzanowski, Somerset, N.J., assignors to Minerals & Chemicals Philipp Corporation, Woodbridge Township, N.J., a corporation of Maryland
No Drawing. Filed Feb. 19, 1964, Ser. No. 345,869
6 Claims. (Cl. 252—450)

This invention relates to a novel cracking catalyst and to its preparation from naturally-occurring kaolin clay.

Kaolin clay that has been acid activated by the process of U.S. 2,967,157 to Alfred J. Robinson et al. is one of the most effective catalysts heretofore used in the cracking of petroleum hydrocarbons to produce gasoline. Briefly, the acid activation treatment entails mixing kaolin clay, an abundant aluminum silicate mineral of the formula $Al_2O_3 \cdot 2SiO_2 \cdot 2H_2O$, with a 60% to 125% dosage of a concentrated solution of sulfuric acid. The mixture is formed into particles of desired size and shape and aged at elevated temperature (denned) until the acid reacts with the alumina of the clay, forming a sulfate of aluminum in situ. Without washing water-soluble reaction products, the reacted mixture is then calcined to eliminate the sulfate from the particles, resulting in an activated aluminum silicate residue of substantially the same analysis as a starting clay.

An object of this invention is the provision of a synthetic aluminosilicate catalyst for cracking heavy petroleum fractions to gasoline, which catalyst is exceptionally selective even at very high conversion levels and which results in very little coke formation and will, therefore, maintain such activity and selectivity for a long period of time.

Another object of this invention is the provision of a method for converting kaolin clay into an exceptionally selective and active cracking catalyst.

A specific object is the provision from kaolin clay of a cracking catalyst which is more selective for any level of conversion than commercial cracking catalysts obtained by acid activation of kaolin clay.

Another object is to improve the catalytic cracking of petroleum hydrocarbons with a kaolin-derived catalyst in a manner such as to produce more gasoline and less coke and gas than with a commercial acid activated kaolin catalyst.

In accordance with this invention, a novel cracking catalyst having unique and valuable properties is obtained from kaolin clay as follows: Uncalcined kaolin clay is mixed with a concentrated sulfuric acid solution and with a finely divided, absorptive source of amorphous silica, the source of silica being a material which is reactive with alkali solution but which is unreactive with the sulfuric acid. An essential characteristic of the mixture is that the source of reactive silica is employed in amount to provide at least $\frac{1}{10}$ mol reactive $SiO_2$ per mol uncalcined kaolin clay $(Al_2O_3 \cdot 2SiO_2 \cdot 2H_2O)$. Another essential characteristic is that the quantity of sulfuric acid solution must be sufficient to form a plastic mixture with the uncalcined kaolin clay and with the source of silica. This quantity of sulfuric acid will vary with the nature of the uncalcined kaolin clay, especially the particle size of clay. It will vary, also, with the abstorptivity and quantity of the source of silica. Another essential feature of the mixture is that the proportions of uncalcined kaolin clay and source of reactive silica are selected so that the plastic mixture of uncalcined kaolin clay, source of reactive silica and concentrated sulfuric acid solution contains at least 45 cubic centimeters of total liquid per 100 grams solids, on a volatile free solids weight basis. Volatile free (V.F.) weight is determined by heating a material to essentially constant weight at 1800° F. The mixture of clay, silica and acid is formed into particles of desired size and shape and, as in the process of U.S. 2,967,157, the particles are aged at elevated temperature (denned), until the acid reacts with the alumina of the clay; the reacted particles are then calcined to eliminate sulfate, producing porous rigid particles. An aqueous solution of sodium hydroxide is impregnated into the porous particles and the solution is then reacted with the ingredients of the porous particles by heating the particles under pressure sufficient to maintain the water in the impregnated solid in liquid state until the constituents of the mass crystallize. The alkali reacted particles are contacted with a solution of a nonalkali metal salt, such as a calcium salt solution, under conditions favoring ion-exchange of the alkali in the reacted particles with nonalkali metal cations. The ion-exchanged particles are then dehydrated to produce a cracking catalyst of exceptionally high activity and selectivity.

Following is a diagrammatic representation of a specific form of our process for converting kaolin clay into a cracking catalyst having exceptionally high activity and selectivity.

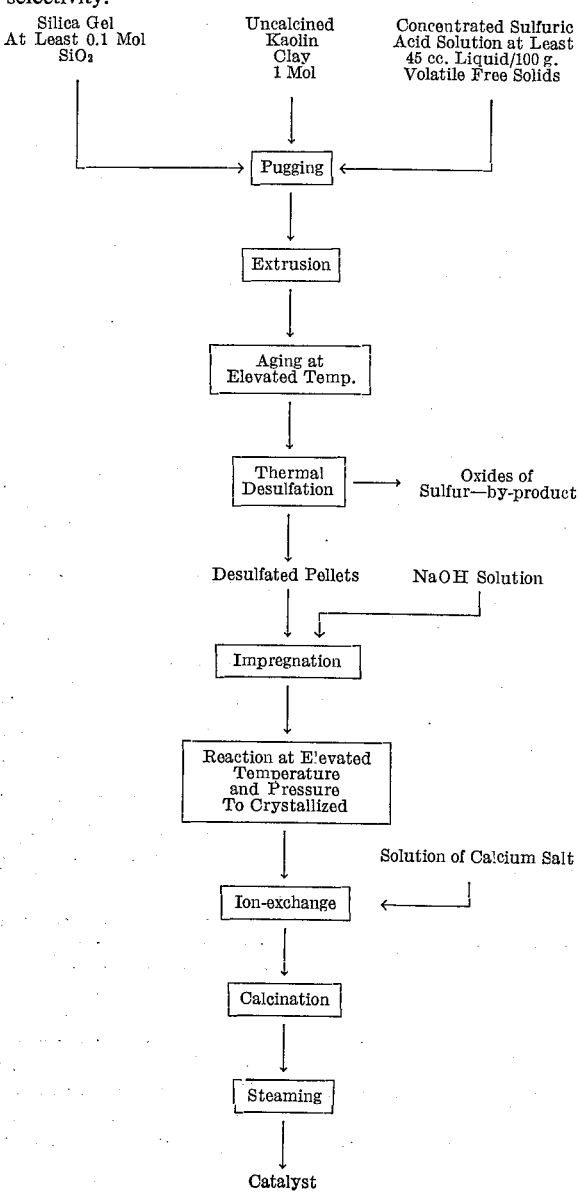

Sources of absorptive reactive silicas that are suitable for purposes of this invention are finely divided (minus 200 mesh) solids and are generally characterized by: (1) low density, e.g., a particle density less than 2.5 cubic centimeters per gram; (2) the silica is amorphous or non-crystalline (i.e., the silica-bearing material does not diffract X-radiation). Naturally occurring high purity amorphous silicas, such as diatomaceous earth, are recommended. Also suitable are high purity amorphous silicas such as produced commercially by precipitation from solutions of alkali silicates or by hydrolysis of organic silicon compounds. These materials are frequently referred to as "functional silica pigments" and are useful, for example, as flatting agents in the formulation of paints. Still another type of absorptive silica that can be used is a finely divided silica residue obtained by removal of cations other than silica from a mineral structure in which there is a continuous silica skeleton. These residues are obtained by acid leaching of clays, vermiculite and the like. Mixtures of any of the aforementioned absorptive reactive silicas can be used. Quartz, which is crystalline, and its polymorphs are not suitable and do not produce the desired results. It is reasonable to expect that certain low density, finely divided silicates can be used provided the cation portion is inert towards alkali solution. Among such silicates is dehydrated kaolin clay which has been calcined at a temperature and for a time sufficient for the kaolin exotherm to take place but insufficient for crystallization to occur, e.g., kaolin calcined at 1700° F. to 2000° F. for suitable time. In the resulting amorphous dehydrated clay substantially all of the alumina and part of the silica is inert towards alkali solution. The uncalcined kaolin clay we use can be raw kaolin as mined although preferably the kaolin should be refined to at least the extent that grit and coarse agglomerates are eliminated.

We employ the source of reactive silica in a proportion such as to provide at least 1/10 mol reactive $SiO_2$ per mol of uncalcined kaolin clay ($Al_2O_3 \cdot 2SiO_2 \cdot 2H_2O$). The desired catalyst will not be obtained when smaller quantities of silica are used. Considerably more silica, such as an amount up to about 3½ mols per mol of clay can be employed although the resulting catalyst may be somewhat softer than when we add our preferred proportion ranging from ½ to 1 mol reactive silica per mol of clay.

In producing our catalyst, the commercially available 66° Bé. acid (about 93% $H_2SO$) is suitable although we are not restricted to the use of this particular concentration of acid. While acid as dilute as about 80% concentration could be used, the product may not be as hard as when solutions of at least 90% concentration are used. As mentioned, an essential feature of our process is that the acid solution must be employed in amount sufficient to form a plastic mixture with the clay and source of silica and also to result in a mixture containing at least 45 cubic centimeters of liquid per 100 grams of solids, on a volatile free solids basis. Unless the acid solution is employed in an amount to provide a total of at least 45 cubic centimeters of liquid per 100 grams of volatile free solids, the desired crystalline material will not form when the alkali impregnated particles are heated. The use of sufficient concentrated acid solution to provide a mixture of plastic consistency will not suffice unless the quantity that is employed also provides the essential volume of liquid in the mixture.

The clay, silica and acid can be mixed in any order that is desired. The sequence of mixing is immaterial and all ingredients can be mixed simultaneously if desired.

Suitable conditions for forming particles, such as pellets or microspheres, from the reactants and then reacting and desulfating the reaction mixture are described in U.S. 2,-967,157. Generally speaking, aging is at a temperature of at least 250° F. and below 500° F. The preferred procedure, when making coarse particles such as pellets for moving bed catalyst processes, entails the use of an oil aging treatment and is described in U.S. 3,033,798 to James V. Weir et al. Pellets can be rounded before aging as by the oil tumbling procedure of U.S. 3,024,206 to James B. Duke. In making a fluid catalyst, microspheres can be formed by simple modification of the air spray drying process of U.S. 3,039,973 to Alfred J. Robinson et al.

As a result of the reaction between the acid and alumina, the reaction masses are hardened. These reacted masses are then thermally desulfated to decompose the aluminum sulfate reaction product and to eliminate gaseous oxides of sulfur under conditions such as set forth in U.S. 2,967,157, supra. Desulfation is carried out at a product temperature below 1600° F. Preferably, thermal desulfation is conducted in a reducing atmosphere whereby desulfation takes places at a temperature that is well below the normal decomposition temperature of aluminum sulfate (1432° F.).

The desulfated masses at this point of the process are highly porous and appreciably lower in density than they would be in the absence of absorptive silica during the particle forming step. When impregnated with aqueous alkali solution containing the desired quantity of caustic to be reacted with the masses, the masses will imbibe substantial quantities of such solution. The NaOH dosage absorbed by the porous particles may be as low as about 20% although the activity and selectivity of the finished catalyst may be somewhat less than when a higher dosage is used. A highly active and selective catalyst was obtained with a NaOH dosage stoichiometric for reaction with all of the alumina in the porous matrix. This dosage, in the case of a reaction mixture obtained by mixing 1 mol kaolin clay with ½ mol reactive $SiO_2$, is a 32% weight dosage (32 parts of NaOH to 100 parts of mixture of clay and silica). Present experience indicates that a sodium hydroxide dosage in excess of that required to react with all of the alumina in the clay may be desirable. Alkali concentration is selected to assure that the desired NaOH dosage is absorbed in the porous particles. The solutions should have a concentration of at least 20% NaOH (weight basis), usually 25% or more, in order to provide an adequate NaOH dosage. The impregnation can be carried out by immersion or spraying techniques. It is recommended to use an impregnating solution that is at room temperature. Excess concentrated caustic solution should be drained from the impregnated desulfated masses to insure the proper dosage of caustic in the masses.

The impregnated masses are heated to promote reaction between the alkali and ingredients of the matrix material. The masses should be out of contact with an external liquid phase which would leach solubles therefrom. Thus, the masses should not be immersed in water during this heating step. The masses can be surrounded by air during the alkali aging although it may be desirable to immerse them in a nonreactive oil. It is essential to control the environment during the heating step to prevent substantial dehydration of the impregnating solution. In other words, the pressure in the reactor must be sufficient to maintain the water in liquid condition at the temperature in the reactor. Higher pressures than required to maintain the water in liquid state can be used. The caustic will react with the acid-activated clay and with the reactive silica in the matrix during the heating step. A pH test on a wash liquid can be used to establish the completion of such reaction. After the reaction with the alkali is completed, the heating under pressure to maintain water liquid must be continued until the reaction masses are crystallized. Crystallization is determined by standard X-ray diffraction techniques and is ascertained by the presence of well-defined diffraction maxima on a pattern of the specimen under investigation. Present experience indicates that the crystallized material may comprise a mixture of crystalline species, possibly mixed with amorphous matter.

After the pellets have crystallized they are contacted with a dilute aqueous solution of a salt of a nonalkali metal under conditions favorable to ion-exchange therebetween. In base-exchanging calcium ion for sodium ion, at least 90% and preferably 95% or more of the sodium ions originally present should be replaced by the calcium ions. Known base-exchange techniques and equipment can be used for the purpose. Suitable calcium salts for the exchange step include the chloride, nitrate and acetate although other salts, such as the bromide, lactate, formate, can be used. At least sufficient calcium salt must be employed in the aqueous ion-exchange medium to provide for the desired exchange of sodium. Preferably, a substantial excess of calcium is used. As examples of other compounds which can be used to replace alkali ions in the reaction product are salts of the following: manganese, vanadium, chromium, cerium, aluminum, rare earths (lanthanum, praesodymium, neodymium and samarium), and mixtures thereof. Ammonium ions may also be present in the exchange solutions together with the aforementioned metal cations or mixtures thereof. Elevated temperatures can be used to promote ion-exchange, especially in the latter stages of the ion-exchange step. The exchange particles are then substantially fully dehydrated by calcination. Calcination temperatures of 800° F. to 1100° F. are suggested.

The calcination treatment may be and is preferably either followed by or preceded by other treatments for adjusting or stabilizing the activity of the catalyst. As an example of such treatment may be mentioned a steaming of the calcined catalyst particles before charging the catalyst to a hydrocarbon conversion unit to adjust the catalyst to a conversion level sufficiently low for use in conventional cracking units operating with present-day catalysts. Steaming at 1000° F. to 1300° F. with 100% steam for 1 to 4 hours is suggested for such activity adjustment.

The catalyst of the present invention is useful for cracking hydrocarbon oils of the type used as catalytic cracking feedstocks. The cracking operation can be carried out at catalyst temperatures of about 800° F. to about 1000° F. with pressures from 1 to 4 atmospheres (absolute). The catalyst is especially useful in cracking to high conversion levels, i.e., conversion levels above about 55%. The catalyst of this invention is highly selective, even at exceptionally high conversion levels. This fact is evident from the exceptionally high gasoline yields and desirably low coke and gas yields. Coke yield is usually less than that of commercial kaolin catalyst.

The following example is given to illustrate this invention and to show the higher activity and greater selectivity of our novel catalyst as compared with a commercial acid-activated kaolin catalyst.

In accordance with this invention 200 parts by weight of dry, minus 325 mesh functional silica pigment containing 7% volatile matter (Syloid 72) was thoroughly blended in a Baker Perkins pug mill with 1290 parts by weight of dry kaolin clay that had been obtained by sand grinding a coarse size fraction of Georgia kaolin clay to 92% minus 2 microns (e.s.d.). The sand grinding procedure is described in U.S. 3,097,801 to James B. Duke. The starting clay had a volatile matter content of about 14% and contained about 40% $Al_2O_3$ by weight and 45% $SiO_2$. To the dry mixture in the pug mill, 2158 parts by weight of a 66° Bé. solution of $H_2SO_4$ (corresponding to about 100 cubic centimeters of acid solution to 100 grams of volatile free components) was slowly added and the mixture thoroughly blended in the pug mill, forming a mass of extrudable consistency. The freshly blended mix was extruded into 0.17″ diameter pellets with a piston-type extruding machine. The pellets were charged into a vertical vessel through which mineral oil at about 285° F. was continuously circulated. Pellet retention time in the hot oil was about 4 hours. The drained pellets were then desulfated (and residual oil burned off) in a calciner in which steam and reducing components were continuously passed. During operation the temperature of the calciner averaged about 1500° F. and residence time was 4 hours.

The desulfated pellets were then impregnated with a 26% solution of sodium hydroxide, using 123 parts by weight of solution to 100 parts by weight of pellets (32% NaOH dosage). Impregnation was carried out by adding the solution, cooled to room temperature, to the pellets while the pellets were continuously being agitated by rotating the jar holding the pellets. The pellets were then sealed in a tightly sealed glass jar and the jar was immersed for 24 hours in a water bath maintained at 100° F. The jars were then placed in a 200° F. oven and held there for 24 hours.

An X-ray diffraction pattern of the product had a diffraction peak of greatest intensity at 6.2°2θ. From the locations and relative intensities of the diffraction peaks on the pattern, it was concluded that the particles contained a zeolitic molecular sieve of the synthetic faujasite type as the principal crystalline constituent. The X-ray pattern had a much weaker peake at 7.2°2θ, indicating that a small amount of sodium zeolite A was also present. Diffraction peaks characteristic of kaolinite were not present.

The composition of the resulting pellets was calculated to be as follows (volatile free basis):

$$1.000\ Na_2O : 1.000\ Al_2O_3 : 2.675\ SiO_2$$

The sodium aluminum silicate pellets were washed batchwise with 200 ml. portions of unheated, distilled water until the washer liquor had a pH of 10.8. The washed pellets were placed in an exchange column and exchanged 35 times with 200 ml. portions of a 2% aqueous solution of $CaCl_2$ at room temperature. Following this the pellets were exchanged 15 times with 200 ml. portions of the 2% $CaCl_2$ solution at 150° F. ±10° F. The pellets were washed with distilled water by percolating distilled water through the column of pellets. Washing was continued until the effluent was essentially chloride free. The pellets were air dried at 200° F. for 2 hours. The density of the product was 0.60 gram per cubic centimeter.

A portion of the dried calcium exchanged pellets was calcined in air at 1050° F. for 3 hours and then subjected to 100% steam at 1350° F. for 4 hours to adjust their activity.

Following is an analysis of the exchanged product after the steam treatment:

| | Wt. percent |
|---|---|
| L.O.I. | 1.13 |
| $Al_2O_3$ | [1] 32.60 |
| $SiO_2$ | [1] 50.21 |
| $Na_2O$ | 0.45 |
| CaO | 15.61 |

[1] Calculated from analysis of starting clay.

This analysis indicates that about 95% of the sodium ions in the crystals had been exchanged by calcium ions.

The calcium aluminum silicate pellets were employed in a cracking test unit designed to evaluate the activity of a cracking catalyst at standard conditions. This test, referred to as the "CAT–D" test, is a modification of the CAT–A method described in "Laboratory Method for Determining the Activity of Cracking Catalysts," by J. Alexander and H. E. Shimp, page R537, National Petroleum News, August 2, 1944. In carrying out the CAT–D test a heavy gas oil feedstock is used. Cracking is carried out at 900° F. with 10% steam and a liquid space rate of 1.0 (volume charge/volume of catalyst/per hour) for a 15 minute operation period.

The CAT–D properties of the experimental catalyst were compared with the CAT–D properties of a sample of commercial kaolin cracking catalyst. The commercial catalyst was obtained by reacting kaolin clay with sulfuric acid followed by reductive desulfation. The commercial catalyst contained about 45% $Al_2O_3$, the balance being substantially SiO₂. The results of the comparison are summarized in Table I.

TABLE I.—CATALYTIC EVALUATIONS (CAT-D TEST) OF CATALYSTS DERIVED FROM KAOLIN CLAY

|  | Experimental Kaolin Catalyst | Commercial Kaolin Catalyst |
| --- | --- | --- |
| Gasoline, vol. percent | 55.8 | 35.8 |
| Coke, wt. percent | 3.7 | 3.8 |
| Gas, wt. percent | 14.3 | 18.2 |
| Conversion, wt. percent | 67.3 | 53.5 |
| Gas gravity | 1.52 | 1.47 |

The data show that under identical test conditions the experimental catalyst was markedly more active than the commercial catalyst (a 67.3% conversion as compared with 53.5% conversion for the commercial catalyst). This improvement was coupled with a higher gasoline yield (55.8% as against 35.8%) together with a corresponding reduced gas and coke make. The coke make of the experimental catalyst was compared with the extrapolated coke make of the commercial catalyst at the 67.3% conversional level (the extrapolation having been made on a graph correlating coke make with conversion level). It was found that the coke make of the experimental catalyst was only 0.53 the coke make of the commercial catalyst. Another desirable feature of the experimental catalyst was the high specific gravity of the gas product, indicating that C₃ and C₄ olefins were produced instead of hydrogen which would have reduced gas gravity.

Reactor temperature was varied from 800° to 950° F. in the CAT-D test to determine effect of such variation on activity and selectivity of the experimental catalyst. It was found that the experimental catalyst was more selective and active than the commercial catalyst at these levels.

The term "NaOH weight dosage" as used herein refers to the weight of 100% NaOH per unit weight of volatile free solids in the porous desulfated particles, expressed as a percentage.

We claim:
1. A method of making active catalyst particles from kaolin which comprises
mixing kaolin clay with an absorptive source of alkali-reactive silica in amount to provide at least 0.1 mol SiO₂ per mol of said clay and with a concentrated sulfuric acid solution in amount that is sufficient to form a plastic mixture with said clay and said source of silica and results in a mixture containing at least 45 cubic centimeters of liquid per 100 grams solids, on a volatile free solids weight basis,
forming said mixture into particles,
heating said particles at a temperature and for a time to cause substantially complete reaction between alumina in said clay and said acid,
calcining said particles to eliminate all sulfate therefrom,
impregnating said desulfated particles with sodium hydroxide solution,
heating said impregnated particles while maintaining them under a pressure sufficient to maintain the water in liquid state until the particles crystallize,
ion-exchanging substantially all of the sodium ions in said particles with nonalkali cations,
and dehydrating said particles at elevated temperature to convert the particles into cracking catalyst particles having high activity and selectivity.
2. A method for making active catalyst particles from kaolin clay which comprises
mixing uncalcined kaolin clay with absorptive alkali-reactive silica and a concentrated aqueous solution of sulfuric acid, said silica being present in amount of at least 1/10 mol per mol of said clay and said acid solution being present in amount to result in at least 45 cubic centimeters of liquid per 100 grams of solids in said mixture, on a volatile free solids weight basis, said amount of acid solution being sufficient to form an extrudable mixture with said silica and said uncalcined clay,
forming said mixture into particles,
aging said particles at an elevated temperature for a time sufficient to effect substantially complete reaction of the alumina in the clay with said acid,
calcining said particles to eliminate all sulfate completely therefrom,
impregnating said desulfated particles with an aqueous sodium hydroxide solution of at least 20% concentration and in amount sufficient to provide a NaOH weight dosage of at least 20%,
heating said impregnated particles while maintaining them under pressure sufficient to maintain the water in the impregnating solution in liquid state until the particles crystallize,
contacting said particles with an aqueous solution of a calcium salt so as to exchange subsantially all of the sodium ions in said particles with calcium ions,
dehydrating said particles at elevated temperature, thereby converting said particles into cracking catalyst particles having high activity and selectivity,
and adjusting the activity and selectivity of said catalyst by subjecting them to the action of steam.
3. The method of claim 2 in which said silica is diatomaceous earth.
4. The method of claim 2 in which said silica is silica gel.
5. A method of making active catalyst particles from kaolin clay which comprises
forming plastic particles composed of a mixture of kaolin clay, an absorptive source of alkali-reactive silica in amount to provide at least 0.1 mol SiO₂ per mol of said clay and a concentrated sulfuric acid solution in amount that is such that the particles contain at least 45 cubic centimeters of liquid per 100 grams solids, on a volatile-free solids weight basis,
heating said particles at a temperature and for a time to cause substantially complete reaction between alumina in said clay and said acid,
calcining said particles to eliminate all sulfate therefrom,
impregnating said desulfated particles with an aqueous solution of sodium hydroxide,
heating said impregnated particles while maintaining them under pressure sufficient to maintain the water in liquid state until the particles crystallize,
ion-exchanging sodium ions in said particles with non-alkali cations,
and dehydrating said particles at elevated temperature to convert the particles into cracking catalyst particles having high activity and selectivity.
6. A method for making active catalyst particles from kaolin clay which comprises
mixing uncalcined kaolin clay with an absorptive source of alkali-reactive silica and a concentrated aqueous solution of sulfuric acid, said silica being present in amount of at least 0.1 mol per mol of said clay and said acid solution being present in amount to result in at least 45 cubic centimeters of liquid per 100 grams of solids in said mixture, on a volatile-free solids weight basis, said amount of acid solution being sufficient to form an extrudable mixture with said source of silica and said uncalcined clay,
forming said mixture into particles by extrusion,
aging said particles at an elevated temperature for a time sufficient to effect substantially complete reaction of the alumina in the clay with said acid,
calcining said particles to eliminate all sulfate therefrom, impregnating said desulfated particles with an aqueous sodium hydroxide solution of at least 20 percent concentration and in amount sufficient to provide a NaOH weight dosage of at least 20 percent, heating said impregnated particles while maintaining them under pressure sufficient to maintain the water in the impregnating solution in liquid state until the particles crystallize, ion-exchanging sodium ions in said particles with non-alkali cations, and dehydrating said particles at elevated temperature, thereby converting said particles into cracking catalyst particles having high activity and selectivity.

References Cited

UNITED STATES PATENTS

| 1,918,361 | 7/1933 | Wiberg et al. | 23—112 |
| 2,967,158 | 1/1961 | Malone | 252—450 |
| 2,992,068 | 7/1961 | Haden et al. | 23—112 |
| 3,119,659 | 1/1964 | Taggart et al. | 23—112 |
| 3,140,251 | 7/1964 | Plank et al. | 208—120 |

DANIEL E. WYMAN, *Primary Examiner.*

DELBERT E. GANTZ, EDWARD J. MEROS, *Examiners.*

A. RIMENS, CARL F. DEES, *Assistant Examiners.*